United States Patent [19]
Halpern

[11] 3,710,175
[45] Jan. 9, 1973

[54] TWINKLE EFFECT DISPLAY SYSTEM IN WHICH INFORMATION IS MODULATED AT A RATE WITHIN THE FLICKER FREQUENCY OF THE HUMAN EYE

[75] Inventor: Howard S. Halpern, Stamford, Conn.

[73] Assignee: United Aircraft Corporation, East Hartford, Conn.

[22] Filed: June 20, 1969

[21] Appl. No.: 835,141

[52] U.S. Cl................315/30, 315/22, 343/5 MM, 343/5 SC
[51] Int. Cl................................................H01j 29/52
[58] Field of Search.....315/18, 25, 30, 22; 343/5 SC, 343/5 MM; 340/324

[56] References Cited

UNITED STATES PATENTS

| | | |
|---|---|---|
| 3,614,035 | 10/1971 | Buynak et al.....................343/5 MM |
| 3,555,179 | 11/1971 | Robin...............................343/5 MM |
| 2,956,203 | 10/1960 | Beste......................................315/30 |
| 3,054,998 | 9/1962 | Cooper et al............................343/5 |
| 3,128,460 | 4/1964 | Moller et al. ......................343/5 SC |
| 3,335,315 | 8/1967 | Moore...........................340/324.1 X |
| 3,404,309 | 10/1968 | Massell et al............................315/18 |

*Primary Examiner*—Leland A. Sebastian
*Assistant Examiner*—J. M. Potenza
*Attorney*—Melvin Pearson Williams

[57] ABSTRACT

A twinkle effect display system comprises a display device, the intensity input of which is amplitude modulated at a rate within the usable flicker frequency band of the human eye. The modulation may be either symmetrical or asymmetrical and may be either continuous or in steps; and the index of modulation may range from one hundred percent to appreciably lower values which still provide a readily observable twinkling.

3 Claims, 2 Drawing Figures

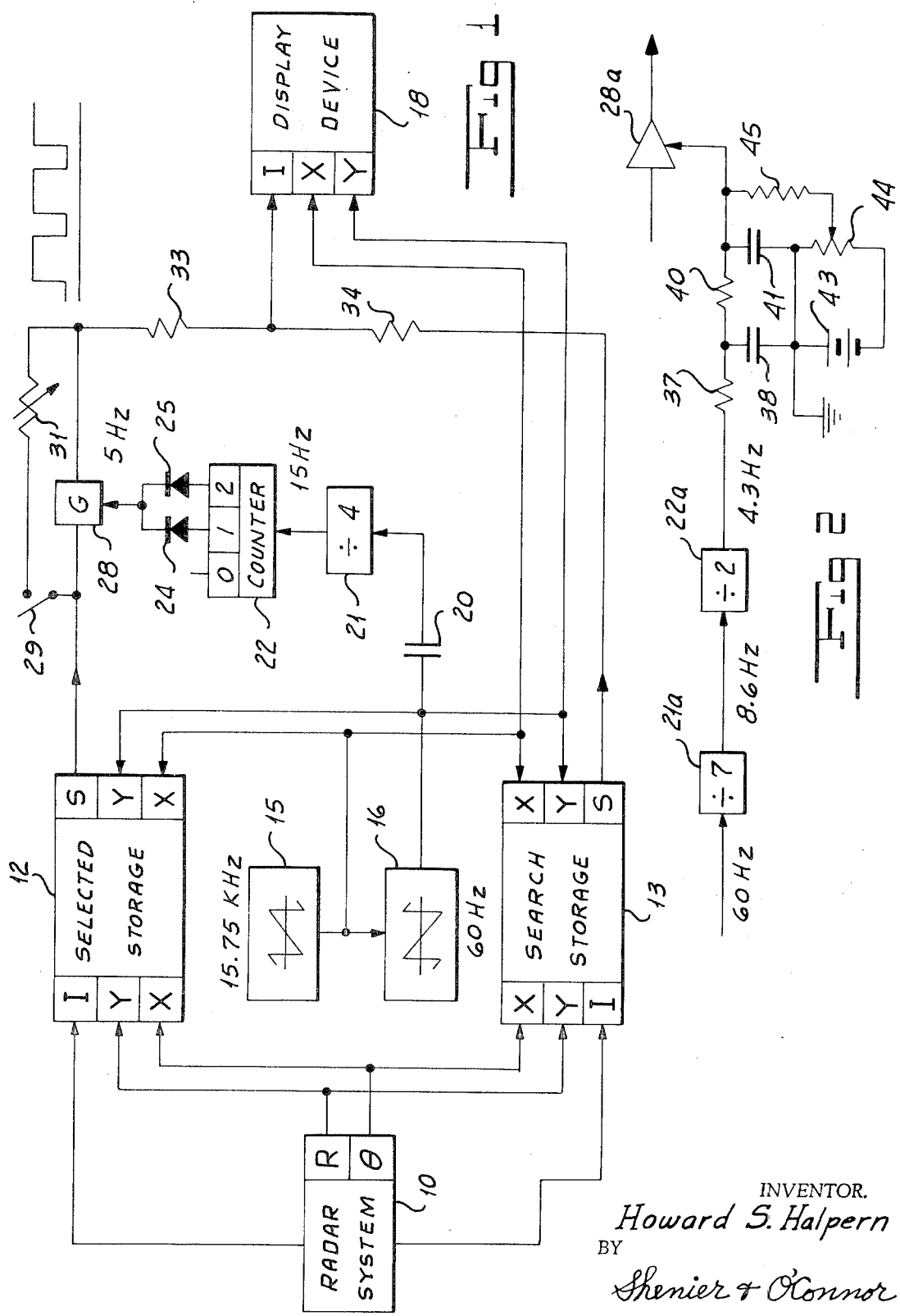

TWINKLE EFFECT DISPLAY SYSTEM IN WHICH INFORMATION IS MODULATED AT A RATE WITHIN THE FLICKER FREQUENCY OF THE HUMAN EYE

SUMMARY OF THE INVENTION

One object of my invention is to provide a twinkle effect display system in which the video signal to the intensity input of a display tube is amplitude modulated.

Another object of my invention is to provide a twinkle effect display system in which the modulation may be either symmetrical or asymmetrical.

Still another object of my invention is to provide a twinkle effect display system in which the modulation may be either continuous or in steps.

A further object of my invention is to provide a twinkle effect display system in which the index of amplitude modulation may range from one hundred percent to appreciably lower values which still provide a readily observable twinkling.

Other and further objects of my invention will appear from the following description.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a schematic view illustrating an embodiment of my invention in which the modulation is stepwise and asymmetrical.

FIG. 2 is a fragmentary schematic view showing symmetrical and continuous amplitude modulation.

DESCRIPTION OF THE PREFERRED EMBODIMENT

Referring now more particularly to FIG. 1 of the drawings, a radar system 10 provides a saw-tooth output in accordance with the range of targets which is coupled to the Y inputs of storage devices 12 and 13. The azimuth output of the radar system 10 is coupled to the X inputs of storage devices 12 and 13. Radar system 10 provides a video output corresponding to reflections from targets which is coupled to the intensity input of the search storage device 13. The radar system 10 may also identify selected targets. Such selected targets would include moving targets such as aircraft, land vehicles, and ships, as well as targets provided with radar transponders. The video output of radar system 10 corresponding to the selected targets is coupled to the intensity input of the selected storage device 12.

Storage devices 12 and 13 may each comprise a pair of cathode ray tubes connected face to face. The information from radar system 10 is accommodated at the scan rate of the radar system. It is desired to read and display the recorded information at much higher scan rates. The construction and operation of scan converter storage tubes 12 and 13 is well known to the art as, for example, Types H1161, H1203, and H1213 of the Hughes Aircraft Company, Oceanside, Calif. The output of a 15.75 KHz saw-tooth generator 15 is coupled to the X reading beam inputs of storage tubes 12 and 13 and to the X input of a display device such as tube 18. The output of horizontal sweep generator 15 also synchronizes a vertical sweep generator 16 which provides a saw-tooth output of 60 Hz. The output of vertical sweep generator 16 is coupled to the Y reading beam inputs of storage tubes 12 and 13 and to the Y input of display tube 18. Display device 18 may thus provide 525 lines per frame and 30 frames per second with interlaced scanning. The reading signal output of storage tube 12 is coupled through a gate 28 and a summing resistor 33 to the intensity input of display tube 18. The reading signal output of storage tube 13 is coupled through a summing resistor 34 to the intensity input of display tube 18. Gate 28 is shunted by a single-pole, double-throw, manually operable switch 29 which is connected in series with a variable resistor 31.

The output of vertical sweep saw-tooth generator 16 is coupled through a differentiating capacitor 20 to the input of a divide-by-four ring counter 21. Ring counter 21 provides output pulses at a 15 Hz rate, which are applied to a three-stage ring counter 22. Ring counter 22 provides respective "0", "1" and "2" outputs. The "1" and "2" outputs of ring counter 22 are coupled forwardly through respective OR circuit crystals 24 and 25 to the control input of gate 28.

In operation of my invention, search information signals from radar system 10 are coupled to the storage section of device 13; and information regarding selected targets is coupled to the storage section of device 12. The information stored in both devices 12 and 13 will be simultaneously presented to display device 18. However, the information from the selected storage device 12 is amplitude modulated at a rate within the usable flicker frequency band of the human eye.

The upper limit of the usable flicker frequency band of the human eye is governed in some manner by the frequency of brain waves. Any modulation at a rate adjacent the upper limit is not only objectionable, but, if sufficiently intense, can induce "red-out" or flicker vertigo. The upper limit of the flicker frequency band, that is, the flicker vertigo frequency, varies somewhat for different people and with their physical condition.

The lower limit of the usable flicker frequency band of the human eye also depends upon physiological factors. The human eye is extremely sensitive to differential motion and differential changes in illumination anywhere within the field of vision. Peripheral vision not only establishes that some differential effect has occurred but also indicates the directional coordinates of that point within the visual field where the effect has occurred. However, it is not until the eye can be focussed on such point that the effect may be evaluated. In general, two successive effects are required before an evaluation can be made. If a large angular movement of the eye is needed, then two successive effects may be required for focussing so that three successive effects are needed for evaluation. The eye moves essentially in a step-wise fashion. The limiting factor for eye movement is not angular velocity but, instead, frequency of steps. The maximum frequency of steps is that associated with nystagmus, which involves some coupling with brain waves. The lower limit of the usable flicker frequency band is then somewhat less than the uncontrollable nystagmus frequency. If the modulating frequency is appreciably lower than this, then, after the first effect, the eye will move to focus on the proper point for evaluation of the second effect. However, if the second effect is delayed excessively, the eye will jump to a somewhat different and improper position as the initial step of a search pattern. When the excessively delayed second effect does occur, the eye is not properly focussed and will move back to the proper point for evaluation of the third effect.

The usable flicker frequency band of the human eye thus extends from somewhat less than the nystagmus frequency to a safe margin below the flicker vertigo frequency.

Upon each retrace of vertical sweep generator 16, a pulse is coupled through differentiating capacitor 20 to index ring counter 21 which provides an output pulse once for each four retraces of vertical sweep generator 16. These output pulses from counter 21 index counter 22. It will be noted that gate 28 is enabled by both the "1" and the "2" outputs of counter 22 through OR circuit crystals 24 and 25. Gate 28 is disabled when counter 22 provides a "0" output. The modulation of the reading signal output of storage device 12 is thus an asymmetrical square-wave with a mark-space ratio of two. When switch 29 is open and gate 28 is disabled, no reading signal from storage device 12 is coupled to the intensity input of display device 18; and the index of amplitude modulation is accordingly one hundred percent. The index of amplitude modulation may be reduced by closing switch 29 and adjusting resistor 31 as desired, so that some portion of the reading signal from storage device 12 is always coupled through switch 29, resistor 31, and resistor 33 to the intensity input of display device 18. Selected targets from storage device 12 will thus be presented to display device 18 at a 5 Hz twinkle rate. The selected targets will be highly illuminated for eight fields or four frames and will be extinguished or only partially illuminated (depending upon the position of switch 29) for four fields or two frames. The selected targets are thus readily identified against the steady background display from storage device 13.

Referring now to FIG. 2, retrace pulses from differentiating capacitor 20 at a 60 Hz rate are coupled to a divide-by-seven ring counter 21a which provides output pulses at an 8.6 Hz rate. The output pulses of ring counter 21a are applied to a divide-by-two ring counter or counting flip-flop 22a which provides a symmetrical square-wave of unity mark-space ratio at a 4.3 Hz rate. The square-wave output of counting flip-flop 22a is coupled to a first integrating circuit comprising series resistor 37 and shunt capacitor 38. The voltage output across capacitor 38 is a symmetrical triangular wave-form having equal positive and negative slopes and is applied to a second integrating circuit comprising series resistor 40 and shunt capacitor 41. The voltage output across capacitor 41 is a substantially sinusoidal wave-form and is applied to the gain control input of a balanced video amplifier 28a. The positive terminal of a bias battery 43 is grounded. Battery 43 is shunted by a potentiometer 44. The slider of potentiometer 44 is coupled through a resistor 45 to the gain control input of amplifier 28a. The reading signal output of storage device 12 is applied to the input of variable gain amplifier 28a; and the output thereof is coupled through summing resistor 33 to the intensity input of display device 18, as in FIG. 1.

In operation of the circuit of FIG. 2, the reading signal output of storage device 12 is modulated at a 4.3 Hz twinkle rate by the continuous and substantially sinusoidal voltage wave-form across capacitor 41. The modulation index may be controlled by adjustment of potentiometer 44. If amplifier 28a comprises a pair of sharp cut-off pentodes or a pair of field effect transistors, then the modulation index may be made substantially equal to one hundred percent by adjusting potentiometer 44 so that amplifier 28a is cut off at the peak negative excursion of the voltage wave-form across capacitor 41. The modulation index may be reduced by adjusting the slider of potentiometer 44 to a more positive potential, so that amplifier 28a is not cut off at the peak negative excursion of the modulating wave-form across capacitor 41. It will also be appreciated that if amplifier 28a comprises a pair of remote cut-off pentodes, then the modulation index will always be appreciably less then 100 percent irrespective of the positioning of the slider of potentiometer 44. In the circuit of FIG. 2, switch 29 and variable resistor 31 of FIG. 1 are no longer needed to effect control over the index of amplitude modulation. In FIG. 2, selected targets will have higher than average illumination for seven fields or three and one-half frames and will have lower than average illumination for a succeeding period of seven fields or three and one-half frames. Selected targets from storage device 12 will thus be presented to display device 18 at a symmetrical 4.3 Hz twinkle rate and are readily distinguished from the steady background display of storage device 13.

It will be seen that I have accomplished the objects of my invention. I have provided a twinkle effect display system in which the video signal is amplitude modulated at a rate within the usable flicker frequency band of the human eye. The amplitude modulation may be either symmetrical or asymmetrical and may be either continuous or in discrete steps. The index of amplitude modulation may be varied from one hundred percent to appreciably lower values which still provide a readily observable twinkling.

It will be understood that certain features and subcombinations are of utility and may be employed without reference to other features and subcombinations. It will be further understood that various changes in detail may be made without departing from the spirit of my invention.

Having thus described my invention, what I claim is:

1. A twinkle effect display system including in combination:

a display device having video input means and having horizontal and vertical sweep inputs;

first and second video signal sources having video signal outputs;

timing signal generating means coupled to the horizontal and vertical sweep inputs of said display device for controlling the horizontal and vertical sweeps thereof at a cyclic rate;

means coupling the video signal output of said first video signal source to the video input means of said display device;

means including modulation means for coupling the video signal output of said second video signal source to the video input means of said display device, said modulation means including a frequency divider connected to said timing signal generating means to modulate the amplitude of signals coupled from the video signal output of said second video signal source to the video input means of said display device at a frequency which is a sub-multiple of said cyclic rate and which is within the useable flicker frequency band of the human eye.

2. A twinkle effect display system including in combination:
- a display device having a video input and having horizontal and vertical sweep inputs;
- first and second video signal sources having read-out control inputs and video signal outputs;
- means coupling the video signal output of said first video signal source to the video input means of said display device;
- means including modulation means for coupling the video signal output of said second video signal source to the video input means of said display device, said modulation means including an input to receive timing signals and responsive to timing signals received thereat to modulate the amplitude of signals coupled from the video signal output of said second video signal source to the video input means of said display device at a frequency within the useable flicker frequency band of the human eye; and
- timing signal generating means coupled to the readout control inputs of said video signal sources, to the horizontal and vertical sweep inputs of said display device, and to the timing signal input of said modulation means, thereby to synchronize the modulation of said second video signal source output and the sweep of said display device with the readout of said video signal sources.

3. A twinkle effect display system including in combination:
- a display device having video input means;
- first and second video signal sources having video signal outputs;
- means coupling the video signal output of said first video signal source to the video input means of said display device; and
- means including variable modulation means for coupling the video signal output of said second video signal source to the video input means of said display device and for modulating the amplitude of signals coupled from the video signal output of said second video signal source to the video input means of said display device at a frequency within the useable flicker frequency band of the human eye, said modulation means including adjustable means to vary, in accordance with the adjustment thereof, the minimum amplitude of video signals coupled from said second video signal source to the video input means of said display device, thereby to vary the index of amplitude modulation provided by said modulation means.

* * * * *